(12) United States Patent
Pereira

(10) Patent No.: US 8,625,401 B2
(45) Date of Patent: Jan. 7, 2014

(54) SYSTEM AND METHOD FOR REDUCING RF EMISSIONS ASSOCIATED WITH AN OPTICAL DRIVE LASER DIODE HFM SIGNAL

(75) Inventor: David M. Pereira, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 2466 days.

(21) Appl. No.: 11/237,578

(22) Filed: Sep. 28, 2005

(65) Prior Publication Data

US 2007/0070863 A1    Mar. 29, 2007

(51) Int. Cl.
*G11B 7/00* (2006.01)

(52) U.S. Cl.
USPC .......................................................... 369/116

(58) Field of Classification Search
USPC ........... 372/38.02, 38.07, 38.09; 331/57, 185; 369/124.04; 250/205, 214
See application file for complete search history.

(56) References Cited

U.S. PATENT DOCUMENTS

| | | | | |
|---|---|---|---|---|
| 4,414,583 A | * | 11/1983 | Hooker, III | 358/300 |
| 4,835,782 A | * | 5/1989 | Kaede et al. | 372/32 |
| 5,309,461 A | * | 5/1994 | Call et al. | 372/38.09 |
| 6,489,600 B1 | * | 12/2002 | Taguchi | 250/205 |
| 6,653,908 B1 | * | 11/2003 | Jones | 331/183 |
| 7,193,480 B2 | * | 3/2007 | Ishida et al. | 331/57 |
| 2005/0201434 A1 | * | 9/2005 | Tatsuta | 372/38.02 |

OTHER PUBLICATIONS

Intersil, Data Sheet EL6202, "Laser Driver Oscillator" Elantec. Jun. 11, 2004 (9 pages).

* cited by examiner

*Primary Examiner* — Nicholas Lee
(74) *Attorney, Agent, or Firm* — Terrile, Cannatti, Chambers & Holland, LLP; Robert W. Holland

(57) ABSTRACT

An optical drive laser diode drive current has a High Frequency Modulation (HFM) signal superimposed to aid optical medium readability. The HFM signal is provided by an HFM oscillator interfaced with the laser diode drive current to provide the HFM signal with a frequency from within a predetermined range. A frequency controller varies the frequency of the HFM signal over time to reduce RF emissions associated with the HFM signal. For instance, the HFM signal frequency is varied in a swept sawtooth or triangle pattern. As another example, the HFM frequency is varied with random selections of frequencies from a predetermined frequency range.

19 Claims, 3 Drawing Sheets

SYSTEM AND METHOD FOR REDUCING RF EMISSIONS ASSOCIATED WITH AN OPTICAL DRIVE LASER DIODE HFM SIGNAL

BACKGROUND OF THE INVENTION

1. Field of the Invention

The present invention relates in general to the field of information handling system optical drives, and more particularly to a system and method for reducing RF emissions associated with an optical drive laser diode High Frequency Modulation (HFM) signal.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Over time, information handling systems have packed increasing information processing capability in smaller housings. For example, the powerful information processing capability of portable information handling systems, also known as laptops, has encouraged greater numbers of consumers to rely on a portable system as a primary household system. One difficulty that has arisen from the increased processing power built within small or portable housings is the management of increased radio frequency (RF) emissions output by the more powerful processing components used in the systems. RF emissions interfere with surrounding electronic devices and are thus restricted to certain limits by national and international regulatory bodies. For this reason, RF emissions are typically suppressed with a number of physical techniques, such as bonding, shielding and circuit layout design. However, each of these physical techniques tends to increase the size and expense of an information handling system. RF suppression presents a significant challenge with portable information handling systems, which typically have reduced space to include shielding or rearrange circuit layouts.

One way to reduce overall RF emissions for an information handling system is to build the system with processing components that have reduced RF emissions. The optical drive is one example of a processing component that generates RF emissions. For example, semiconductor laser diodes typically use a High Frequency Modulation (HFM) signal that produces relatively high levels of RF emissions. The HFM signal is used to compensate for noise in the semiconductor laser diodes (LDs) by superimposing the HFM signal over normal laser drive current. The noise is produced in the optical drive's read channel due to laser mode switching that occurs, as an example, when a portion of the LD's output is reflected back into the LD. The HFM signal superimposed on the normal laser drive current has an amplitude sufficient to force the LD on and off with each cycle of the HFM signal. Because the LD presents a non-linear load to the HFM signal, the harmonic content of the current in the circuit can be quite high, producing substantial RF emissions. These relatively high RF emissions when combined with RF emissions from other components of an information handling system can cause failure to achieve regulatory limitations on RF emissions. Such failures increase system cost and delay design completion while RF emission issues are analyzed and corrective actions performed.

SUMMARY OF THE INVENTION

Therefore a need has arisen for a system and method which reduce RF emissions associated with optical drive laser diode HFM signals.

In accordance with the present invention, a system and method are provided which substantially reduce the disadvantages and problems associated with previous methods and systems for managing RF emissions produced by an optical drive. The HFM signal applied to a laser diode is modulated in frequency over time to reduce RF emissions associated with the HFM signal.

More specifically, an oscillator applies an HFM signal to a laser diode drive current of an optical drive. A frequency controller interfaced with the oscillator changes the frequency of the HFM signal over time to reduce RF emissions associated with the HFM signal. The pattern and rate of modulation of the HFM signal frequency is selectable across a predetermined frequency range to provide a desired RF emission profile associated with the HFM signal to manage the overall RF emission profile of the optical drive or an information handling system having the optical drive. For instance, the frequency pattern may use randomly selected discrete frequencies from one or more predetermined frequency ranges. Alternatively, the frequency pattern may use swept frequency patterns, such as a triangle or sawtooth pattern.

The present invention provides a number of important technical advantages. One example of an important technical advantage is that RF emissions produced by an optical drive HFM signal are reduced. The RF emissions reduction is provided with minimal modifications, such as minor firmware or hardware changes to introduce frequency modulation to the HFM signal. Reduced RF emissions associated with the HFM signal allows less shielding, leading to reduced system weight, and less study in circuit board layout, leading to reduced design costs.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Changing the frequency of an HFM signal over time reduces RF emissions from an information handling system optical drive. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
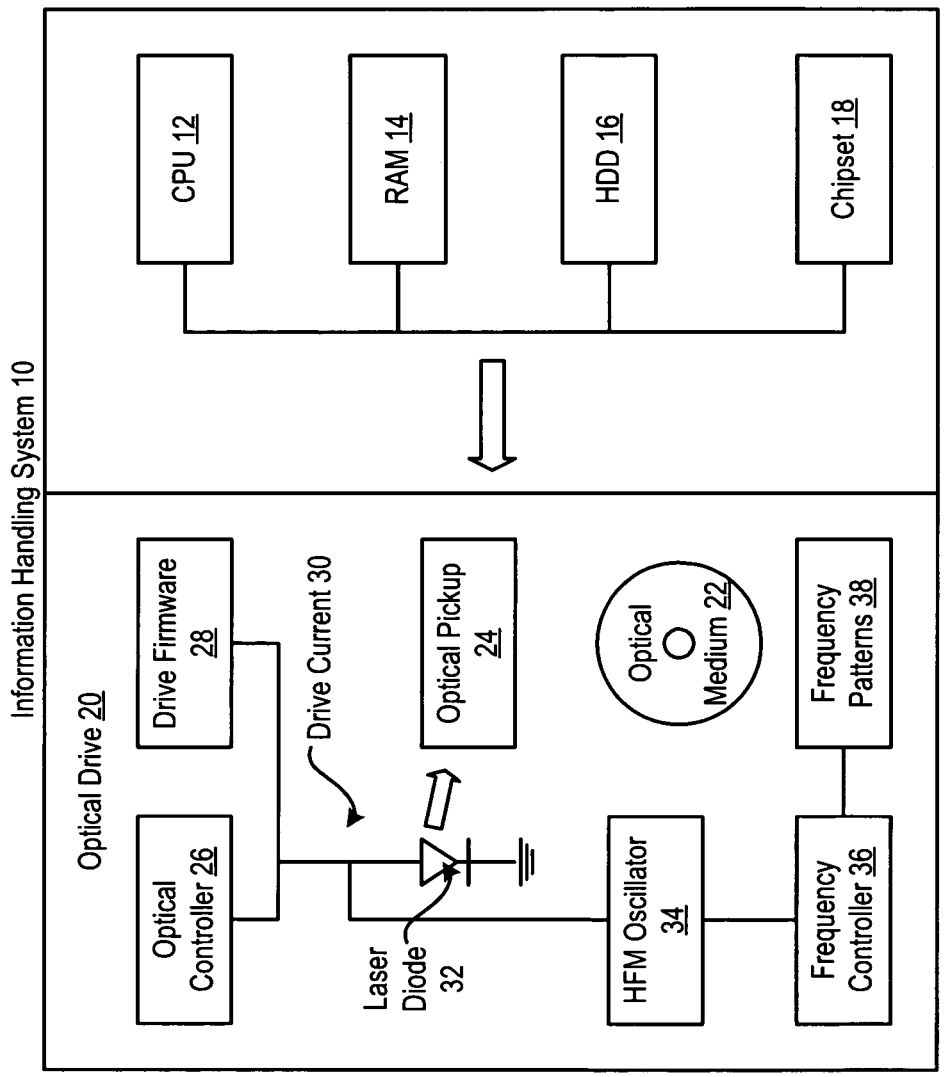
FIG. 1 depicts a block diagram of an information handing system having an optical drive configured to modulate an HFM signal to a laser diode drive current.

Referring now to FIG. 1, a block diagram depicts an information handling system having an optical drive configured to modulate an HFM signal to a laser diode drive current. Information handling system 10 processes information with plural processing components, such as a CPU 12, RAM 14, hard disk drive 16, chipset 18 and an optical drive 20. For instance, optical drive 20 reads information from an optical medium 22 for use by the processing components or accepts information from the processing components to write to optical medium 22. Optical drive 20 interacts with optical medium 22 using one or more lasers contained in an optical pickup 24. For instance, an infrared (IR) laser interacts with Compact Disc (CD) media, a red laser interacts with DVD media, and a blue laser interacts with Blu-ray Disc (BD) media or High Definition Disc (HD-DVD) media. Reads from and writes to optical medium 22 are managed by a drive controller 26 running instructions from drive firmware 28 and also an operating system driver running on CPU 12.

Read and write operations of optical drive 20 are managed with a drive current 30 applied to a laser diode 32 that operates the lasers within optical pickup 24. During read operations, an HFM oscillator 34 applies an HFM signal superimposed over drive current 30 to ensure that laser diode 32 is forced on and off with each cycle of the HFM signal. Although the HFM signal is unnecessary during actual writing of information to the disc, read operations performed in support of write operations to check the accuracy of written information use the HFM signal. The specific frequency of the HFM signal may vary over a range of values as long as the amplitude is sufficient to force switching of laser diode 32. A frequency controller 36 interfaces with HFM oscillator 34 to change the HFM signal frequency over time according to one or more frequency patterns 38. By modulating the frequency of the HFM signal over time, frequency controller 36 distributes RF emissions associated with the HFM signal over a frequency range, lowering the effective RF energy emitted at any one frequency. The rate of change of the HFM signal frequency and pattern of the change are settable, such as with a setting in firmware 28, so that the RF emissions are adjustable for optical drive 20. Thus, for instance, the RF emissions from optical drive 20 may be varied based on the RF emission profile of information handling system 10 to help overall system design meet RF emission constraints.

Figure 2:
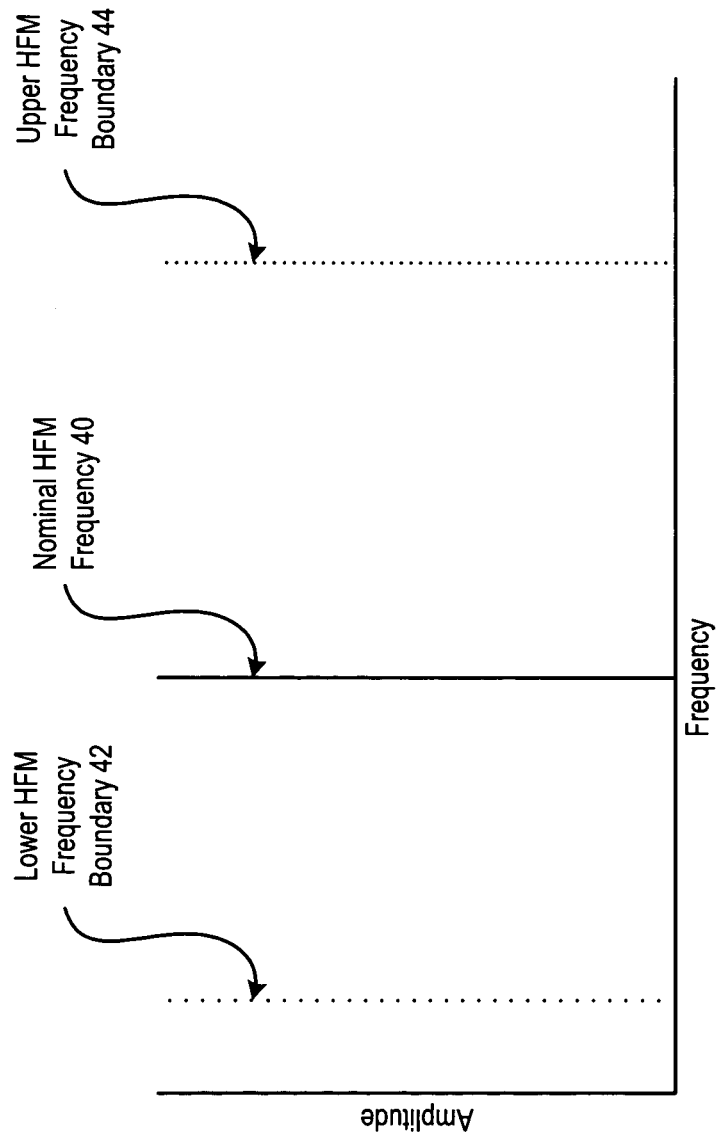
FIG. 2 depicts an amplitude and frequency chart for HFM signal frequency modulation ranges.
Figure 3:
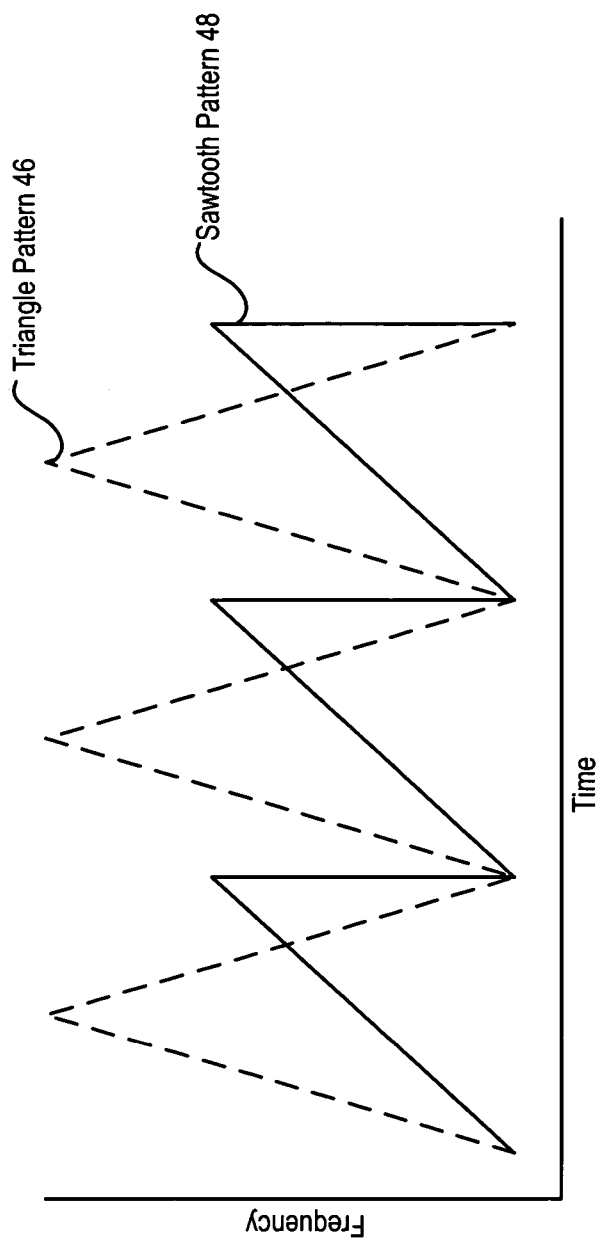
FIG. 3 depicts a frequency and time chart for HFM signal frequency changes modulated over time.

Referring now to FIG. 2, an amplitude and frequency chart depicts HFM signal frequency modulation ranges. A nominal HFM frequency 40 is approximately the middle of a range of frequency values extending from a lower HFM frequency boundary 42 to an upper HFM frequency boundary 44. Modulation of the HFM signal frequency may occur across all values between the lower and upper boundaries or across partial value ranges within the lower and upper boundaries as desired to achieve a system RF emission profile. In one embodiment, the HFM signal frequency is modulated between plural randomly selected discrete values that fall within the frequency range. In alternative embodiments, the HFM signal frequency is swept in predetermined patterns across the frequency range. For instance, referring now to FIG. 3, a frequency and time chart depicts HFM signal frequency changes modulated over time. One example of a swept pattern for frequency changes is the triangle pattern 46, which ascends and descends at substantially the same rate of frequency change. Another example of a swept pattern for frequency changes is the sawtooth pattern 48, which ascends at a constant rate to a maximum frequency value and then returns rapidly to the initial frequency value. Alternative patterns may be used to achieve desired RF emission profiles.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to process information;
   an optical drive interfaced with the processing components, the optical drive operable to read information from an optical medium with a laser and to communicate the information to the processing components, the laser managed with a laser diode having a drive current;
   an HFM oscillator interfaced with the drive current and operable to apply an HFM signal to the drive current; and
   a frequency controller interfaced with the HFM oscillator and operable to frequency modulate the HFM signal in one or more predetermined patterns.

2. The information handling system of claim 1 wherein the predetermined pattern comprises a swept pattern within a frequency range.

3. The information handling system of claim 2 wherein the swept pattern comprises a sawtooth pattern.

4. The information handling system of claim 2 wherein the swept pattern comprises a triangle pattern.

5. The information handling system of claim 1 wherein the predetermined pattern comprises frequency values selected randomly from within a predetermined frequency range.

6. The information handling system of claim 1 wherein the optical drive is further operable to receive information from the processing components and write the information on the optical medium with the laser.

7. The information handling system of claim 6 wherein the laser comprises an IR laser for reading and writing CD optical media.

8. The information handling system of claim 6 wherein the laser comprises a red laser for reading and writing DVD optical media.

9. The information handling system of claim 6 wherein the laser comprises a blue laser for reading and writing BD or HD-DVD optical media.

10. A method for driving an optical drive laser diode, the method comprising:
   sending a drive current to the laser diode;
   superimposing a high frequency modulation signal over the drive signal; and
   changing the frequency of the high frequency modulation signal in a predetermined pattern.

11. The method of claim 10 wherein changing the frequency further comprises changing the frequency of the high frequency modulation signal in a random pattern having frequencies randomly selected from within a range of frequencies.

12. The method of claim 10 wherein changing the frequency further comprises changing the frequency of the high frequency modulation signal in a swept pattern having frequencies varying within a range of frequencies.

13. The method of claim 12 wherein the swept pattern comprises a sawtooth pattern.

14. The method of claim 12 method of claim 12 wherein the swept pattern comprises a triangular pattern.

15. The method of claim 10 wherein the drive current comprises a drive current for commanding laser illumination to read information from an optical medium.

16. A system for managing an optical drive laser diode drive current, the system comprising:
   an HFM oscillator interfaced with the drive current and operable to superimpose an HFM signal on the drive current, the HFM signal having a frequency; and
   a frequency controller interfaced with the HFM oscillator and operable to selectively alter the HFM signal frequency over time.

17. The system of claim 16 wherein the frequency controller selectively alters the HFM signal frequency with random frequency values selected from a predetermined frequency range.

18. The system of claim 16 wherein the frequency controller selectively alters the HFM signal frequency in a sawtooth pattern.

19. The system of claim 16 wherein the frequency controller selectively alters the HFM signal frequency in a triangle pattern.

* * * * *